(12) United States Patent
Honda (10) Patent No.: US 6,266,967 B1
(45) Date of Patent: Jul. 31, 2001

(54) REFRIGERANT CYCLE SYSTEM FOR VEHICLE AIR CONDITIONER

(75) Inventor: Masahide Honda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/536,532

(22) Filed: Mar. 28, 2000

(30) Foreign Application Priority Data

Mar. 30, 1999 (JP) .................................................. 11-89786

(51) Int. Cl.[7] ........................................................ B60H 1/00
(52) U.S. Cl. ............................. 62/193; 62/200; 62/228.3; 62/231; 62/227
(58) Field of Search ..................... 62/199, 200, 228.1, 62/228.3, 228.4, 228.5, 231, 157, 158, 192, 193, 468, 469, 229, 226, 227

(56) References Cited

U.S. PATENT DOCUMENTS 4,628,700 * 12/1986 Alsenz ..................................... 62/200
4,928,500 * 5/1990 Funahashi et al. ................. 62/231 X
6,145,325 * 11/2000 Hanselmann et al. ............. 62/193 X

FOREIGN PATENT DOCUMENTS

| 0 842 799 A2 | 5/1998 | (EP) . |
| 9-109656 | 4/1997 | (JP) . |
| 11-20463 | 1/1999 | (JP) . |

* cited by examiner

Primary Examiner—Harry B. Tanner
(74) Attorney, Agent, or Firm—Harness, Dickey & Pierce, PPLC (57) ABSTRACT

In a refrigerant cycle system for a vehicle air conditioner, when a continuous operation time of a compressor elapses a predetermined time after the compressor operates, operation of the compressor is forcibly interrupted so that a refrigerant pressure at a suction side of the compressor is changed. Thus, even when the compressor operates continuously in a long time when only a front evaporator operates among front and rear evaporators, the refrigerant pressure at a low-pressure side is forcibly changed so that a rear thermal expansion valve of the rear evaporator is forcibly opened. As a result, lubrication oil staying in the rear evaporator and a low-pressure pipe is introduced into the suction side of the compressor by a refrigerant flow due to a valve opening of the rear thermal expansion valve of the rear evaporator.

15 Claims, 4 Drawing Sheets

REFRIGERANT CYCLE SYSTEM FOR VEHICLE AIR CONDITIONER

CROSS-REFERENCE TO RELATED APPLICATION

This application is related to and claims priority from Japanese Patent Application No. Hei. 11-89786 filed on Mar. 30, 1999, the contents of which are hereby incorporated by reference.

BACKGROUND OF THE INVENTION

1. Field of the Invention

The present invention relates to a refrigerant cycle system having first and second evaporators disposed parallel to each other. The refrigerant cycle system is suitable for a vehicle air conditioner having a front air-conditioning unit for controlling air blown toward a front seat side of a vehicle, and a rear air-conditioning unit for controlling air blown toward a rear seat side of the vehicle.

2. Description of Related Art

In recent years, a request of a large-type vehicle such as a minivan is increased. This type vehicle is necessary to have an air conditioner having a large capacity, such as a dual air conditioner. In a refrigerant cycle of the dual air conditioner, both front and rear evaporators are disposed, while a single compressor and a single condenser are used.

In a vehicle dual air conditioner described in JP-A-9-109656, when the air conditioner operates only for a front seat side of the vehicle, an electromagnetic valve for switching a refrigerant flow toward a rear evaporator is forcibly opened for a short time at predetermined intervals, so that refrigerant staying in the rear evaporator is returned into a compressor. However, in a vehicle where an electromagnetic valve for the rear evaporator is not provided for reducing cost of the air conditioner, when a rear air-conditioning unit is stopped, a lubrication oil staying in the rear evaporator does not return to the compressor, and an oil amount returning to the compressor becomes insufficient. As a result, durability of the compressor is deteriorated.

SUMMARY OF THE INVENTION

In view of the foregoing problems, it is an object of the present invention to provide a refrigerant cycle system having a first evaporator and a second evaporator, which prevents an oil amount returning to a compressor from being insufficient without using an electromagnetic valve for the second evaporator, when only the first evaporator operates.

As a result of experiments and studies by the inventor of the present invention, in a refrigerant cycle system having first and second evaporators, when a compressor operates in a long time when only the first evaporator operates and the second evaporator does not have an electromagnetic valve, a thermal expansion valve of the second evaporator repeats minute opening/closing operations, and an oil amount returning to the compressor becomes insufficient.

Thus, according to the present invention, a refrigerant cycle system including: a compressor for compressing and discharging refrigerant, a condenser for cooling and condensing gas refrigerant discharged from the compressor, a first pressure-reducing unit for decompressing and expanding liquid refrigerant from the condenser, a first evaporator for evaporating refrigerant from the first pressure-reducing unit, a first blower for blowing air toward the first evaporator, a second pressure-reducing unit for decompressing and expanding liquid refrigerant from the condenser, a second evaporator for evaporating refrigerant from the second pressure-reducing unit, and a second blower for blowing air toward the second evaporator. The second pressure-reducing unit is disposed parallel to the first pressure-reducing unit relative to a refrigerant flow direction, and the second evaporator is disposed parallel to the first evaporator relative to the refrigerant flow direction. In the refrigerant cycle system, a control unit controls operation of the compressor to change a refrigerant pressure at a suction side of the compressor when a continuous operation time of the compressor passes a predetermined time after the compressor operates, and the second pressure-reducing unit is a thermal expansion valve which adjusts a super-heating degree of refrigerant at an outlet of the second evaporator by adjusting a valve opening degree. Thus, even when the compressor continuously operates in a long time when only the first evaporator operates, the refrigerant pressure the suction side (low-pressure side) is forcibly changed. Therefore, it is possible to forcibly open the thermal expansion valve of the second evaporator. As a result, lubrication oil staying in the second evaporator, a low-pressure pipe and the like is returned to the suction side of the compressor with a refrigerant flow due to the forcibly opening of the thermal expansion valve. Accordingly, the refrigerant cycle system prevents an oil amount returning to a compressor from being insufficient without using an electromagnetic valve for the second evaporator, when only the first evaporator operates.

Preferably, the control unit forcibly interrupts the operation of the compressor by predetermined number of plural interruptions during a forcible interruption control of the compressor, when the continuous operation time of the compressor passes the predetermined time after the compressor operates. Therefore, a forcibly variation of refrigerant pressure at the low-pressure side is actually performed.

Preferably, the control unit controls an interruption operation of the compressor in accordance with an air temperature blown from the first evaporator. Therefore, it prevents the first evaporator from frosting.

Further, when the refrigerant cycle system is applied to a vehicle air conditioner having a front air-conditioning unit and a rear air-conditioning unit, an oil amount returning to the compressor is prevented from being insufficient when only the front air-conditioning unit operates.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
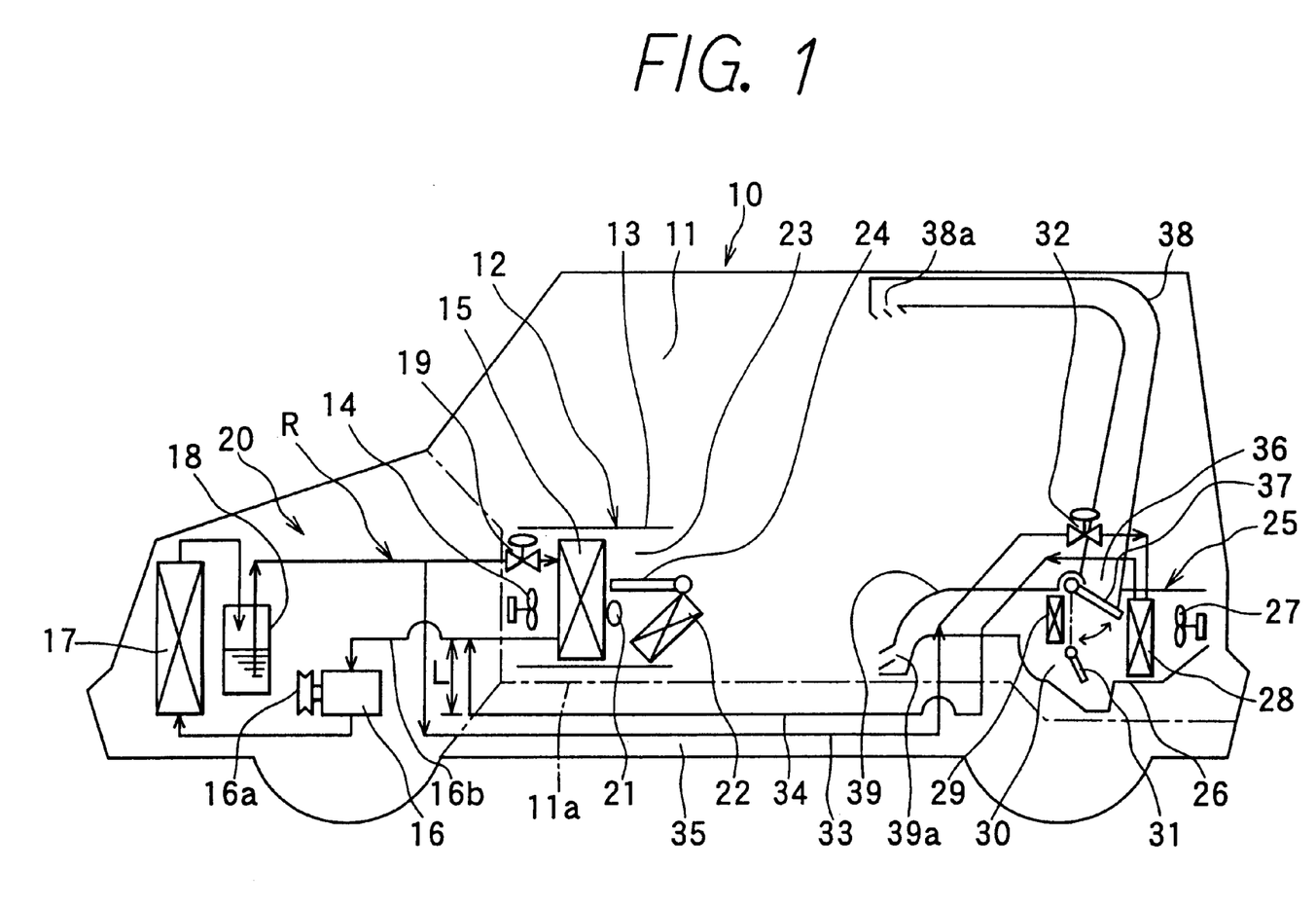
FIG. 1 is a schematic view of an entire system of a vehicle air conditioner according to a preferred embodiment of the present invention.

A preferred embodiment of the present invention will be described hereinafter with reference to the accompanying drawings. In the embodiment, the present invention is typically applied to an air conditioner for a minivan type vehicle. As shown in FIG. 1, a vehicle 10 having a passenger compartment 11 is provided with a front seat including a driver's seat and a front-passenger's seat, and a rear seat including the second and the third seats from the front seat. That is, a longer space is formed in the passenger compartment 11 in a vehicle front-rear direction. A floor surface 11a is provided in the passenger compartment 11.

The air conditioner includes a front air-conditioning unit 12 for adjusting an air state blown toward a front seat side of the passenger compartment 11, and a rear air-conditioning unit 25 for adjusting an air state blown toward a rear seat side of the passenger compartment 11. The front air-conditioning unit 12 is disposed within an instrument panel (not shown) provided at a front most side within the passenger compartment 11. The front air-conditioning unit 12 includes a case 13 for defining an air passage, and a blower 14 disposed at an upstream air side of the case 13. Inside air or outside air from an inside/outside air switching box (not shown) is blown into the air passage of the case 13 by the blower 14.

A front evaporator 15 (main evaporator) of a refrigerant cycle R for cooling air passing therethrough is disposed in the case 13 at a downstream air side of the blower 14. The refrigerant cycle system R includes a compressor 16 driven by a vehicle engine through an electromagnetic clutch 16a. Refrigerant is compressed by the compressor 16 to become high-pressure high-temperature gas refrigerant. Gas refrigerant discharged from the compressor 16 is introduced into a condenser 17. In the condenser 17, gas refrigerant is heat-exchanged with outside air blown by a cooling fan (not shown), and is cooled and condensed.

Refrigerant having passed through the condenser 17 is introduced into a receiver 18, is separated into gas refrigerant and liquid refrigerant, and only liquid refrigerant is stored within the receiver 18. Liquid refrigerant from the receiver 18 is decompressed in a front thermal expansion valve 19, and the decompressed low-pressure refrigerant flows into the evaporator 15. Refrigerant flowing through the front evaporator 15 is evaporated by absorbing heat from air, so that air passing through the evaporator 15 is cooled.

A valve opening degree of the thermal expansion valve 19 is automatically controlled so that a super-heating degree of refrigerant at an outlet of the evaporator 15 is maintained at a predetermined value. Therefore, the thermal expansion valve 19 includes a temperature-sensing portion for sensing a refrigerant temperature at the outlet of the evaporator 15, a first pressure chamber where pressure corresponding to a refrigerant temperature sensed by the temperature-sensing portion is applied, a second pressure chamber where a refrigerant pressure of the evaporator 15 is applied, and a diaphragm partitioning the first and second pressure chambers. In the thermal expansion valve 19, the diaphragm and a valve body are displaced in accordance with a pressure difference between the first and second pressure chambers and a spring pressure, so that a refrigerant flow amount is adjusted.

Gas refrigerant after passing through the evaporator 15 is sucked into again the compressor 16 to be compressed.

Among the refrigerant cycle R, components such as the compressor 16, the condenser 17 and the receiver 18 are mounted in an engine compartment 20 at a front side from the passenger compartment 11.

A temperature sensor 21 is disposed at an air outlet portion of the evaporator 15 within the air conditioning case 13. When air temperature detected by the temperature sensor 21 is lower than a predetermined temperature, electrical power supplying to the electromagnetic clutch 16a is interrupted, and operation of the compressor 16 is stopped. Therefore, it prevents the evaporator 15 from frosting.

Further, a heater core 22 for heating air using hot water from the vehicle engine is disposed at a downstream air side of the evaporator 15 in the case. The heater core 22 is disposed at a lower side in the case 13 so that a bypass passage 23 through which cool air having passed through the evaporator 15 bypasses the heater core 22 is formed at a side of the heater core 22. Further, a plate-like air mixing door 24 is rotatably disposed adjacent to the heater core 22. By adjusting a rotation position of the air mixing door 24, a ratio between an air amount passing through the heater core 22 and an air amount passing through the bypass passage 23 is adjusted, and temperature of air blown into the passenger compartment 11 is adjusted.

At downstream air end of the front air-conditioning unit 12, a defroster opening, a face opening and a foot opening are opened. Those openings are selectively opened and closed by an air outlet door. Specifically, air from the defroster opening is blown toward an inner side of a front windshield, air from the face opening is blown toward the head portion of a passenger on the front seat, and air from the foot opening is blown toward the foot portion of the passenger on the front seat.

Next, the rear air-conditioning unit 25 will be now described. The rear air-conditioning unit 25 is disposed at a side position of the rear seat, for example. The rear air-conditioning unit 25 includes a case 26 for defining an air passage, a blower 27 for blowing inside air into the case 26, a rear evaporator 28 (supplementary evaporator) for cooling air passing therethrough, and a heater core 29 for heating air using hot water from the vehicle engine. The heater core 29 is disposed at a downstream air side of the evaporator 28 in the case 26 to form a bypass passage 30 at a side of the heater core 29. A plate-like cool air bypass door 31 is rotatably disposed adjacent to the heater core 29. The cool air bypass door 31 opens and closes the cool air bypass passage 30 in accordance with an air outlet mode of the rear air-conditioning unit 25 and an air amount level of the blower 27.

A rear thermal expansion valve 32 is provided at a refrigerant inlet side of the evaporator 28. Similarly to the front thermal expansion valve 19, high-temperature high-pressure liquid refrigerant from the receiver 18 is decompressed in the rear thermal expansion valve 32 into gas-liquid two-phase refrigerant. The rear thermal expansion valve 32 adjusts a valve opening degree to adjust the refrigerant flow amount, so that a super-heating degree of refrigerant at an outlet of the rear evaporator 28 becomes a predetermined value.

In the refrigerant cycle R, a refrigerant inlet side of the rear thermal expansion valve 32 is connected to a refrigerant inlet side of the front thermal expansion valve 19 through a high-pressure pipe 33 disposed under the floor surface 11a. Further, a refrigerant outlet side of the rear evaporator 28 is connected to a refrigerant outlet side of the front evaporator 15 through a low-pressure pipe 34 disposed under the floor surface 11a. Thus, in the refrigerant cycle R, the rear evaporator 28 and the rear thermal expansion valve 32 are connected to the front evaporator 15 and the front thermal expansion valve 19 in parallel through the high-pressure pipe 33 and the low-pressure pipe 34. Because the high-pressure pipe 33 and the low-pressure pipe 34 are disposed in a floor space 35 under the floor surface 11a of the passenger compartment 11, the high-pressure pipe 33 and the low-pressure pipe 34 are disposed at a lower position lower than a position of a suction pipe 16a of the compressor 16 by a predetermined distance L (e.g., 600 mm).

Further, in the rear air-conditioning unit 25, a rear face opening 36 and a rear mode door 37 are provided at a position immediately downstream from the rear evaporator 28 in an air-flowing direction, so that cool air cooled in the rear evaporator 28 is blown toward the head portion of a passenger on the rear seat from a ceiling air outlet 38a through the rear face opening 36 and a rear face duct 38. On the other hand, warm air heated in the heater core 29 is blown toward the foot area of the passenger on the rear seat from a rear foot air outlet 39a through a rear foot duct 39.

Figure 2:
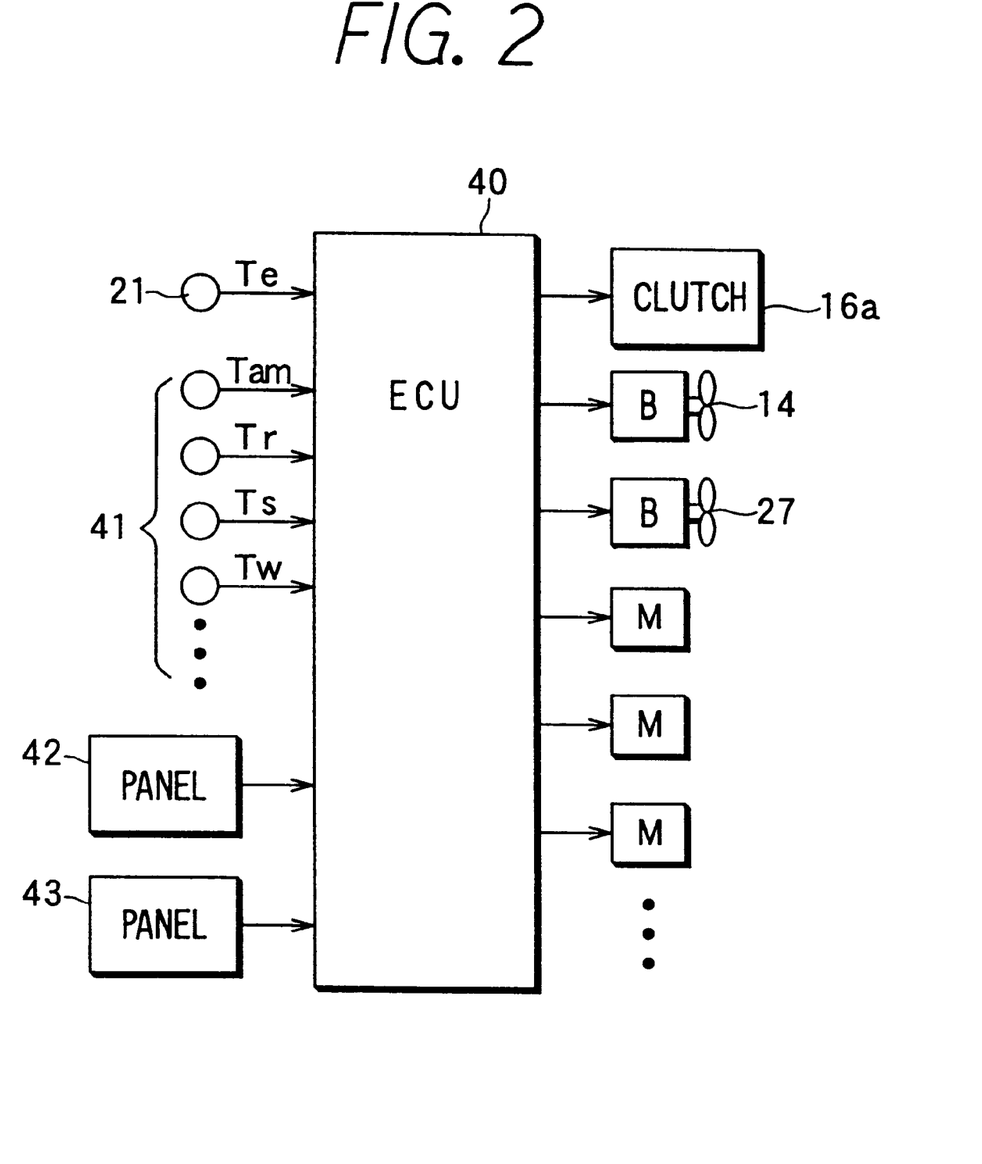
FIG. 2 is a block diagram of an electronic control unit (ECU) according to the embodiment.

FIG. 2 is a block diagram showing a control of an electrical control unit (ECU) 40. The ECU 40 is constructed by a micro-computer and electrical circuits around the micro-computer. In addition to an air temperature Te detected by the temperature sensor 21, an outside air temperature Tam, an inside air temperature Tr, a sunlight amount Ts, a water temperature Tw and the like are input from a sensor group 41 into the ECU 40. Further, operation signals such as a set temperature of the passenger compartment 11, an air amount blown from the blower 14, an inside/outside air switching mode, an air outlet mode and an on/off operation of the compressor 16 are input into the ECU 40 from a front operation panel 42. In addition, operation signals such as an air amount and an air outlet mode for the rear-seat side are input into the ECU 40 from a rear operation panel 43. Here, it is also possible to input the operation signals such as the air amount and the air outlet mode for the rear-seat side from the front operation panel 42.

The ECU 40 performs predetermined calculations based on the input signals in accordance with a pre-set program, and outputs control signals to front and rear components to control operations of the electromagnetic clutch 16a, the blowers 14, 27, the doors 24, 31 and the like.

Next, operation of the air conditioner will be now described. First, when both the front and rear air-conditioning units 12, 25 operate, both the blowers 14, 27 operate so that air is blown from both the blowers 14, 27 to the front and rear air-conditioning units 12, 25. Here, when an air conditioning switch (A/C switch), that is, a compression operation switch of the front operation panel 42 is tuned on, electrical power is supplied to the electromagnetic clutch 16a so that the electromagnetic clutch 16a is turned on. Therefore, in this case, the compressor 16 is driven by the vehicle engine.

Thus, in the front air-conditioning unit 12, air is cooled and dehumidified by the evaporator 15, and thereafter, is heated by the heater core 22. Further, a ratio between the air amount passing through the heater core 22 and the air amount passing through the bypass passage 23 is adjusted by the air mixing door 24, so that the temperature of air blown into the passenger compartment is adjusted.

On the other hand, in the rear air-conditioning unit 25, a rear face mode and a rear foot mode are switched by the mode door 37. During the rear face mode, air having been cooled and dehumidified by the evaporator 28 is blown toward the rear seat side of the passenger compartment from the ceiling air outlet 38a through the rear face duct 38. Further, during the rear foot mode, air having passed through the evaporator 28 is heated by the heater core 29 to be warm air, and the warm air is blown toward the foot area of the passenger on the rear seat from the rear foot air outlet 39a through the rear foot duct 39.

When both the front and rear air-conditioning units 12, 25 operate simultaneously, the front thermal expansion valve 19 is controlled to have a valve opening degree corresponding to a heating load of the front evaporator 15, and the rear thermal expansion valve 32 is controlled to have a valve opening degree corresponding to a heating load of the rear evaporator 28. Therefore, refrigerant amount corresponding to the heating load of the front evaporator 15 passes through the front evaporator 15, and refrigerant amount corresponding to the heating load of the rear evaporator 28 passes through the rear evaporator 28. As a result, the lubrication oil does not stay the low-pressure pipe 34 of the rear air-conditioning unit 25, for example.

When a passenger is seated on the front seat while none passenger is seated on the rear seat in the passenger compartment 11, the operation of the rear blower 27 is stopped by a switch operation in the front operation panel 42 or the rear operation panel 43. Therefore, conditioned air is not blown into the rear air-conditioning unit 25, and the air-conditioning operation of the rear air-conditioning unit 25 is stopped. As a result, in this case, only the front air-conditioning unit 12 operates.

When only the front air-conditioning unit 12 operates, the rear thermal expansion unit 32 repeats minute opening/closing operation. Therefore, liquid lubrication oil stays within the rear evaporator 28 or the low-pressure pipe 34 at a refrigerant outlet side of the rear evaporator 28. Further, because the low-pressure pipe 34 is disposed at the position lower than the suction pipe 16b of the compressor 16 by the predetermined distance L (e.g., 600 mm), the liquid lubrication oil readily stays in the low-pressure pipe 34.

As a result of experiments, in a dual-type vehicle air conditioner where a rear air-conditioning unit does not have an electromagnetic valve for the rear evaporator 28, when the compressor 16 continuously operates in a long time while only the front air-conditioning unit 12 operates, the rear thermal expansion valve 32 repeats the minute opening/closing operation in a long time. Thus, in this case, the liquid lubrication oil is greatly readily stays in the low-pressure pipe 34, and an oil-returning amount into the compressor 16 becomes insufficient.

According to the present invention, for preventing lubrication oil from staying in the low-pressure pipe 34, the operation of the compressor 16 is controlled to be forcibly interrupted when only the front air-conditioning unit 12 operates.

Figure 3:
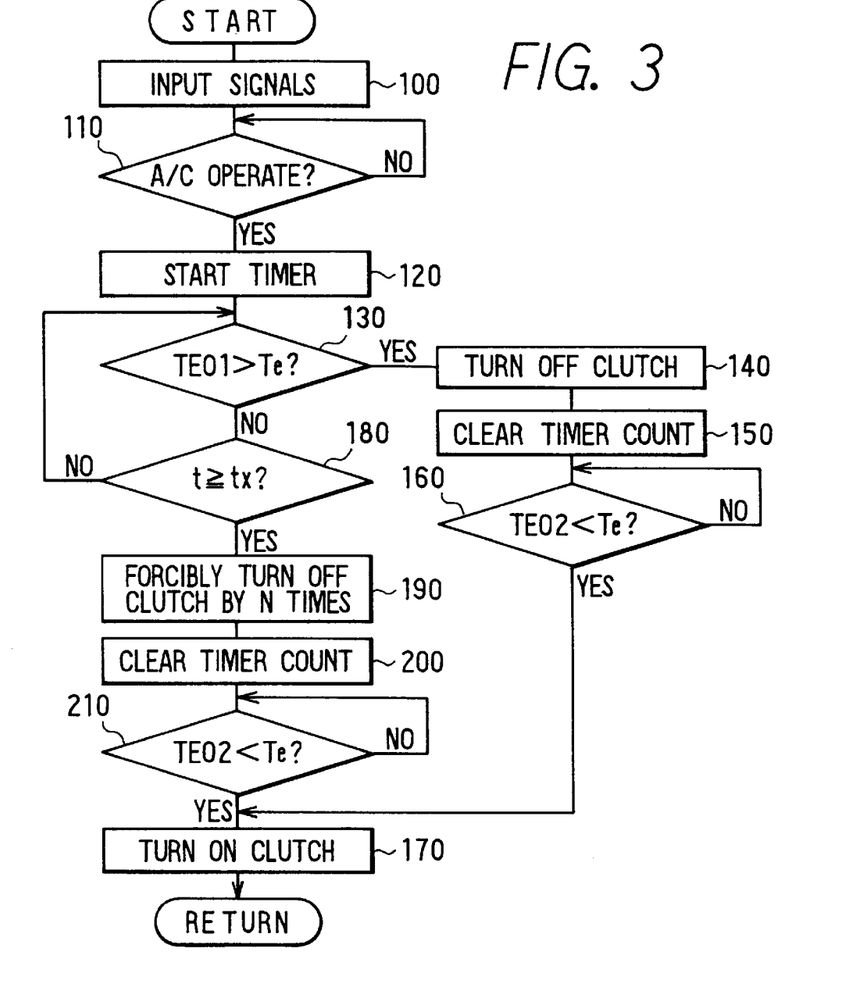
FIG. 3 is a flow diagram showing a control program of the ECU according to the embodiment.

FIG. 3 is a flow diagram showing a control routine of the ECU 40. When an auto switch or an air-conditioning switch (compressor operation switch) is turned on, the control routine of FIG. 3 starts. At step S100, signals detected by the temperature sensor 21 and the sensor group 41 and operation signals from the front and rear operation panels 42, 43 are input. Next, at step S110, it is determined whether or not an air-conditioning (A/C) switch, i.e., the compressor 16 is in an operation state (on-state), based on the input signals. When the compressor 16 is in the operation state, a timer is started at step S120. At step S130, it is determined whether or not the air temperature Te blown from the front evaporator 15, detected by the temperature sensor 21, is lower than a first target temperature TEO1.

Figure 4:
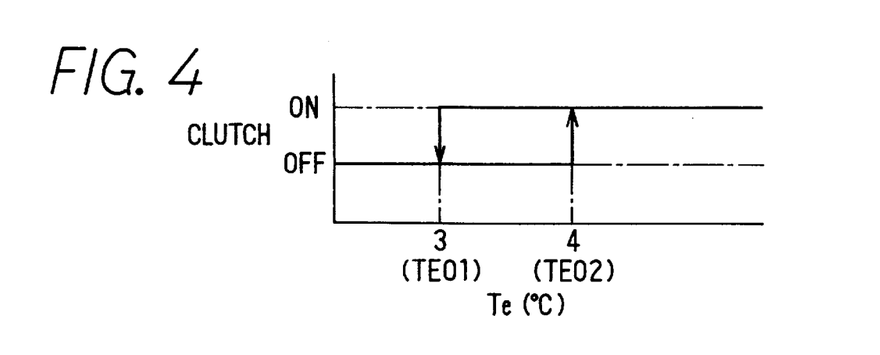
FIG. 4 is a graph showing a relationship between air temperature Te blown from a front evaporator and on/off operation of an electromagnetic clutch according to the embodiment.

In the embodiment, as shown in FIG. 4, the first target temperature TEO1 (e.g., 3° C.) and a second target temperature TEO2 (e.g., 4° C.) are set for the air temperature Te. By comparing the first and second target temperatures TEO1, TEO2 and an actual air temperature Te, an on/off operation signal of the electromagnetic clutch 16a is generated. By setting a temperature difference between the first and second target temperatures TEO1, TEO2, a hysteresis is set in the on and off operations of the electromagnetic clutch 16a, so that frequent interruptions of the compressor 16 are prevented.

Next, when the actual air temperature Te blown from the front evaporator 15 is lower than the first target temperature TEO1 at step S130 in FIG. 3, the electromagnetic clutch 16a is turned off and the compressor 16 is stopped at step S140. Next, the timer count is cleared to zero at step S150, and thereafter it is determined whether or not the actual air temperature Te blown from the front evaporator 15 is higher than the second target temperature TEO2 at step S160. Until it is determined that the actual air temperature Te is higher than the second target temperature TEO2 at step S160, the stop state of the compressor 16 is continuously maintained. When it is determined that the actual air temperature Te becomes higher than the second target temperature TEO2 at step S160, the electromagnetic clutch 16a is turned on at step S170, and the compressor 16 is operated.

On the other hand, when the actual air temperature Te is equal to or higher than the first target temperature TEO1 at step S130, it is determined whether or not a timer time t for which the compressor 16 is continuously operated becomes equal to or longer than a set time tx. The set time tx is set to a predetermined time within 30–120 minutes. When the timer time t becomes equal to or longer than the set time tx at step S180, the electromagnetic clutch 16a is forcibly interrupted by number N of interruptions at step S190. After the latest number interruption, the electromagnetic clutch 16a is maintained at the off state at step S190. Next, the timer count is cleared to zero at step S200, and it is determined whether or not the actual air temperature Te blown from the front evaporator 15 is higher than the second target temperature TEO2 at step S210. Until it is determined that the actual air temperature Te is higher than the second target temperature TEO2 at step S210, the stop state of the compressor 16 is continuously maintained. When it is determined that the actual air temperature Te becomes higher than the second target temperature TEO2 at step S210, the electromagnetic clutch 16a is turned on at step S170, and the compressor 16 is operated.

Figure 5:
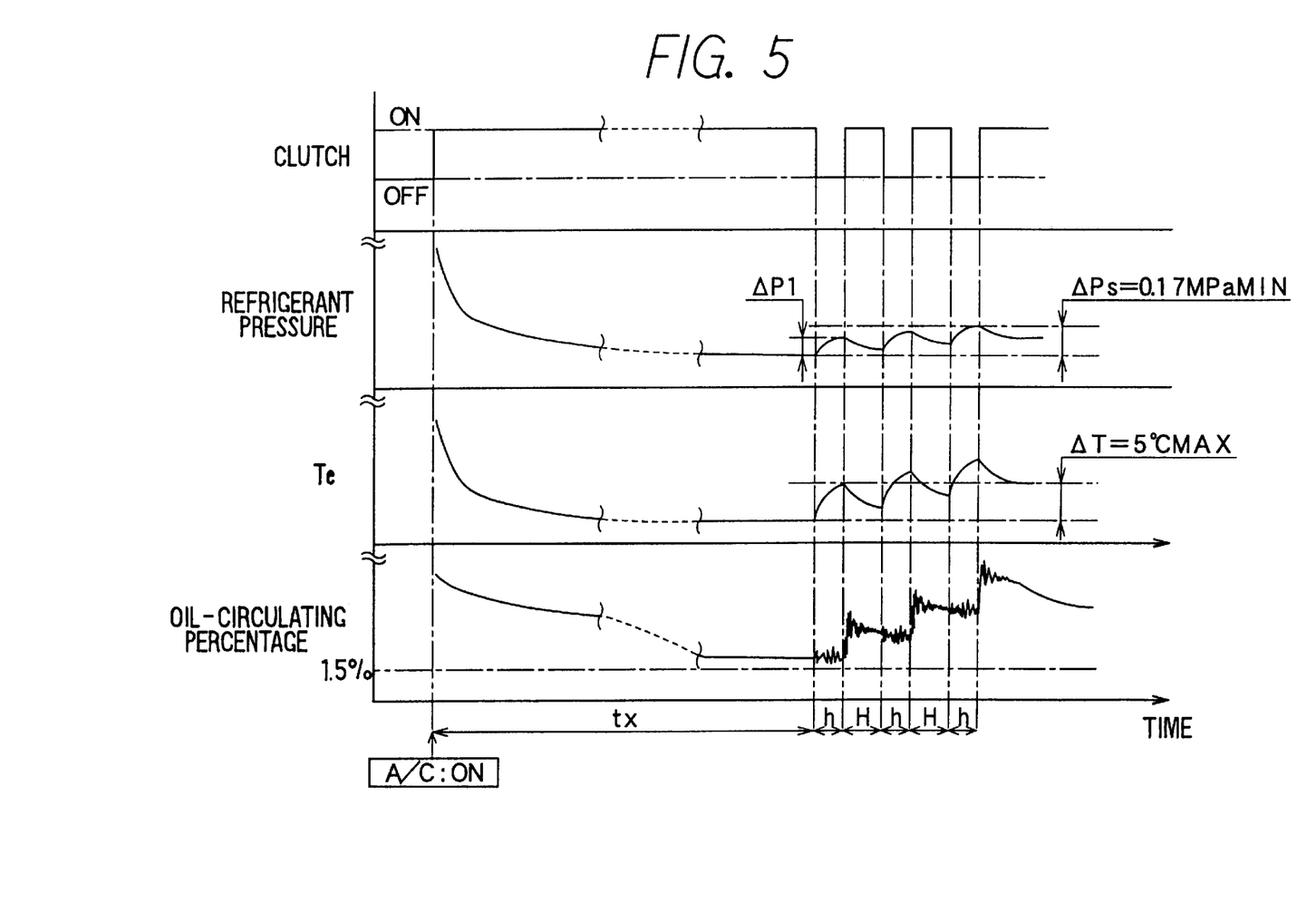
FIG. 5 is a graph showing operation of a refrigerant cycle system when the electromagnetic clutch is forcibly controlled, according to the embodiment.

FIG. 5 shows a forcible interruption control of the compressor 16 when only the front evaporator 15 (i.e., front air-conditioning unit 12) operates. During the forcible interruption control of the compressor 16, the operation of the compressor 16 is forcibly interrupted. In the horizontal axis in FIG. 5, time "h" is a clutch-off time during the forcible interruption control, and time "H" is a clutch-on time during the forcible interruption control. The number N of the interruptions of the forcible interruption control indicates the clutch-off number of the electromagnetic clutch 16a. Thus, in FIG. 5, the number N of interruptions during the forcible interruption control is three.

As shown in FIG. 5, during the forcible interruption control of the electromagnetic clutch 16a, refrigerant pressure at a low-pressure side for the rear seat side and the air temperature Te blown from the evaporator 15 are increased when the electromagnetic clutch 16 is turned off, and are decreased when the electromagnetic clutch 16 is turned on. On the other hand, when only the front air-conditioning unit 12 operates, oil-circulating percentage within the refrigerant cycle is decreased to about 1.5% with the continuously operation of the compressor 16. However, the oil-circulating percentage within the refrigerant cycle is increased stepwise by the forcible interruption control of the electromagnetic clutch 16a. In the embodiment, with the forcible interruption of the compressor 16, the refrigerant pressure at the low-pressure side for the rear seat is changed. That is, the refrigerant pressure at the low-pressure side for the rear seat is decreased when the compressor 16 is turned on, and the rear thermal expansion valve 32 is forcibly opened.

Here, a valve-opening operation of the rear thermal expansion valve 32 during the forcible interruption control is described. When the refrigerant pressure at the low-pressure side for the rear seat is increased while the electromagnetic clutch 16a is turned off, temperature of the temperature sensing portion of the rear thermal expansion valve 32 is increased. Thereafter, the compressor 16 is re-started, and the refrigerant pressure at the low-pressure side for the rear seat is decreased. Thus, a pressure difference is generated in the diaphragm portion of the rear expansion valve 32 in a valve-opening direction, and the rear thermal expansion valve 32 is forcibly opened. Thus, a predetermined refrigerant amount flows into the rear evaporator 29 through the rear thermal expansion valve 32, and lubrication oil staying in the low-pressure pipe 34 and the rear evaporator 29 is pushed to be returned to the suction side of the compressor 16.

As a result, the oil-circulating percentage within the refrigerant cycle is improved, the oil amount returning to the compressor 16 is prevented from being insufficient, and lubrication performance of the compressor 16 is improved when only the front air-conditioning unit 12 operates. Here, the oil-circulating percentage % (OCP) within the refrigerant cycle is calculated by the following formula:

$$OCP = LOA/(LOA+RA) \times 100(\%)$$

wherein LOA is the lubrication oil amount returning to the compressor 16, and RA is the refrigerant amount returning to the compressor 16.

For example, the oil-circulating percentage (OCP) is measured by the following method. That is, in the liquid refrigerant at a downstream refrigerant side of the receiver 18 of the refrigerant cycle, by using the characteristics in which ultraviolet rays are absorbed in the lubrication oil and are not adsorbed in the refrigerant, an absorbance of ultraviolet rays due to the lubrication oil is measured so that the oil-circulating percentage (OCP) is calculated.

Next, the set time tx, the clutch-off time h, the clutch-on time H and the number N of the interruptions will be described.

First, the set time tx of an operation interval is described. After the air-conditioning switch (i.e., compressor operation switch) is turned on, when the compressor 16 continuously operates when only the front air-conditioning unit 12 operates, lubrication oil stays in the low-pressure pipe 34 and the like, and the oil-circulating percentage in the refrigerant cycle is decreased as time passes. A necessary oil-circulating percentage of the compressor 16 is different from each other by the rotation speed of the compressor 16. However, during an engine-idling, the rotation speed of the compressor 16 is approximately maintained at a predetermined speed. Therefore, it is difficult to return the stayed lubrication oil by the variation of the rotation speed of the compressor 16. Thus, in the embodiment, the necessary oil-circulating percentage (e.g., 1.5% in FIG. 5) during the engine-idling is set to a lowest value. A time for which the necessary oil-circulating percentage is decreased to the lowest value is measured, and the time is set as the maximum time of the set time tx. The maximum time of the set time tx is 120 minutes.

On the other hand, when the set time tx of the operation interval is made shorter, the electromagnetic clutch 16a is frequently interrupted, and durability of the electromagnetic clutch 16a is decreased. From the point of the durability of the electromagnetic clutch 16a, the minimum time of the set temperature tx of the operation interval is set to 30 minutes. As a result, the set time tx of the operation interval is set in a range of 30–120 minutes (i.e., 30 minutes≦tx≦120 minutes).

Next, the clutch-off time h will be now described. When the electromagnetic clutch 16a is turned off during the forcible interruption control of the electromagnetic clutch 16a, the air temperature Te blown from the front evaporator 15 is increased as shown in FIG. 5. An increase ratio of the air temperature Te blown from the evaporator 15 is increased as the air amount blown by the from the blower 14 increases. In the embodiment, the clutch-off time h is set so that unpleasant feeling is not given to a passenger even during the maximum air amount of the front blower 14. Here, when a temperature increase width ΔT where the passenger does not sense an unpleasant feeling during the maximum air amount of the front blower 14 is experimentally set to 5° C., the clutch-off time h is calculated so that the ΔT is equal to or lower than 5° C. The calculated clutch-off time h is equal to or shorter than 10 seconds (i.e., h≦10 seconds).

On the other hand, when the clutch-off time h becomes shorter, an increased width ΔP1 shown in FIG. 5 becomes little during the clutch-off time h. Therefore, an opening degree of the rear thermal expansion valve 32 becomes insufficient during the clutch-on time H, and the oil-returning percentage is insufficient. For sufficiently increasing the opening degree of the rear thermal expansion valve 32, it is necessary to set the clutch-off time to be equal to of longer than three seconds.

Thus, in the embodiment, the clutch-off time h is set in a range of 3–10 seconds (i.e., 3 seconds≦h≦10 seconds).

Next, the clutch-on time H will be now described. When the clutch-on time H is made longer, decreasing degrees of the refrigerant pressure at the low-pressure side and the oil-circulating percentage within the clutch-on time H become longer, and the interruption number N is increased. Therefore, from this point, the clutch-on time H is set to be equal to or shorter than 20 seconds.

Conversely, when the clutch-on time H is made shorter, a decrease width of air temperature Te blown from the evaporator 15 due to clutch-on operation becomes little. Therefore, the same result as a case where the clutch-off time h becomes longer is caused, and an unpleasant feeling is given to the passenger. From this point, the clutch-on time H is set to be equal to or longer than 5 seconds. Thus, in the embodiment, the clutch-on time H is set in a range of 5–20 seconds (i.e., 5 seconds≦H≦20 seconds).

Further, the number N (i.e., interruption number N) of the interruptions during the forcible interruption control will be now described. As shown in FIG. 5, as the interruption number (clutch-off number) increases, the oil-returning percentage is increased. When the three interruptions are performed, the oil-circulating percentage is returned to an initial level at which the air-conditioning switch is turned on.

From this point for improving the lubrication performance, it is necessary to set the interruption number N to be equal to or larger than 2, because the oil-circulation percentage is insufficient when the interruption number N is set to 1 (i.e., N=1). On the other hand, when the interruption number N increases, the air temperature Te from the front evaporator 15 increases, and unpleasant feeling is given to the passenger. Thus, in the embodiment, the interruption number N is set in a range of 2–5 (i.e., 2≦N≦5).

In the experiments shown in FIG. 5, the tx is set to 90 minutes (i.e., tx=90 minutes), the clutch-off time h is set to 5 seconds (i.e., h=5 seconds), the clutch-on time H is set to 10 seconds (i.e., H=10 seconds), and the interruption number N is set to 3 (i.e., N=3). As shown in FIG. 5, when an increased width ΔPs due to the forcible interruption control of the compressor 16 becomes equal to or larger than 0.17 MPa, the oil-circulating percentage is increased to the initial level at which the air-conditioning (A/C) switch is turned on.

Although the present invention has been fully described in connection with the preferred embodiment thereof with reference to the accompanying drawings, it is to be noted that various changes and modifications will become apparent to those skilled in the art.

In the above-described embodiment of the present invention, at step S110 in FIG. 3, it is determined whether or not the compressor 16 (i.e. the air conditioning switch) is in the operation state. However, at step S110, it may be determined whether or not the compressor 16 (i.e. the air conditioning switch) is turned on and whether or not only the front air-conditioning unit 12 operates.

In the above-described embodiment of the present invention, when the compressor 16 operates continuously for the set temperature tx, the operation of the compressor 16 which is a fixed capacity type is forcibly interrupted from an outside so that the refrigerant pressure of the low-pressure side for the rear seat is changed. However, as the compressor 16, a capacity-variable type compressor may be used. In this case, by forcibly changing the capacity of the capacity-variable type compressor, the refrigerant pressure of the low-pressure side for the rear seat may be changed.

Further, as the compressor 16, an electrical compressor driven by a motor may be used. In this case, by forcibly changing the rotation speed of the electrical compressor, the refrigerant pressure of the low-pressure side for the rear seat is changed.

Such changes and modifications are to be understood as being within the scope of the present invention as defined by the appended claims.

What is claimed is:

1. A refrigerant cycle system comprising:
    a compressor for compressing and discharging refrigerant;
    a condenser for cooling and condensing gas refrigerant discharged from said compressor;
    a first pressure-reducing unit for decompressing and expanding liquid refrigerant from said condenser;
    a first evaporator for evaporating refrigerant from said first pressure-reducing unit;
    a first blower for blowing air toward said first evaporator;
    a second pressure-reducing unit for decompressing and expanding liquid refrigerant from said condenser, said second pressure-reducing unit being disposed parallel to said first pressure-reducing unit, relative to a refrigerant flow direction;
    a second evaporator for evaporating refrigerant from said second pressure-reducing unit, said second evaporator being disposed parallel to said first evaporator relative to the refrigerant flow direction;
    a second blower for blowing air toward said second evaporator; and
    a control unit that controls operation of said compressor to change a refrigerant pressure at a suction side of said compressor when a continuous operation time of said compressor passes a predetermined time after said compressor operates,
    wherein said second pressure-reducing unit is a thermal expansion valve which adjusts a super-heating degree of refrigerant at an outlet of said second evaporator.

2. The refrigerant cycle system according to claim 1, wherein:
said first evaporator is a main evaporator which is mainly used with the operation of said compressor; and
said second evaporator is a supplementary evaporator which is selectively used during the operation of said compressor.

3. The refrigerant cycle system according to claim 1, wherein said control unit forcibly interrupts the operation of said compressor by predetermined number of plural interruptions during a forcible interruption control of said compressor, when the continuous operation time of said compressor passes the predetermined time after said compressor operates.

4. The refrigerant cycle system according to claim 3, wherein said control unit controls an interruption operation of said compressor in accordance with an air temperature blown from said first evaporator.

5. The refrigerant cycle system according to claim 3, wherein the predetermined time is set in a range of 30–120 minutes.

6. The refrigerant cycle system according to claim 3, wherein:
said control unit interrupts the operation of said compressor for an interruption time, in each interruption during said forcible interruption control of said compressor; and
said interruption time of said compressor is in a range of 3–10 seconds.

7. The refrigerant cycle system according to claim 3, wherein:
said compressor operates for each operation time, during said forcible interruption control of said compressor; and
each operation time of said compressor is in a range of 5–20 seconds.

8. The refrigerant cycle system according to claim 3, wherein:
the predetermined number of said interruptions of said compressor is number of stops of said compressor, during said forcible interruption control of said compressor; and
the predetermined number of said interruptions of said compressor is in a range of 2–5.

9. The refrigerant cycle system according to claim 1, wherein:
said compressor is a capacity-variable type compressor; and
said control unit forcibly changes a capacity of said compressor, when the continuous operation time of said compressor passes the predetermined time after said compressor operates.

10. The refrigerant cycle system according to claim 1, wherein:
said compressor is an electrical compressor; and
said control unit forcibly changes a rotation speed of said compressor, when the continuous operation time of said compressor passes the predetermined time after said compressor operates.

11. The refrigerant cycle system according to claim 1, further comprising
a driving unit for driving said compressor; and
a clutch through which a driving force from said driving unit is supplied to said compressor,
wherein said control unit forcibly changes operation of said clutch, when the continuous operation time of said compressor passes the predetermined time after said compressor operates.

12. The refrigerant cycle system according to claim 4, wherein said control unit performs said forcible interruption control of said compressor, when the air temperature from said first evaporator is larger than a predetermined temperature.

13. The refrigerant cycle system according to claim 12, wherein said control unit performs said forcible interruption control of said compressor, when operation of said second evaporator stops.

14. An air conditioner for a vehicle having a passenger compartment, comprising:
a front air-conditioning case for defining a first air passage through which air is blown toward a front seat side of the passenger compartment;
a rear air-conditioning case for defining a second air passage through which air is blown toward a rear seat side of the passenger compartment;
a compressor for compressing and discharging refrigerant;
a condenser for cooling and condensing gas refrigerant discharged from said compressor;
a first pressure-reducing unit for decompressing and expanding liquid refrigerant from said condenser;
a first evaporator for evaporating refrigerant from said first pressure-reducing unit, said first evaporator being disposed in said front air-conditioning case to cool air passing therethrough;
a first blower for blowing air toward said first evaporator;
a second pressure-reducing unit for decompressing and expanding liquid refrigerant from said condenser, said second pressure-reducing unit being disposed parallel to said first pressure-reducing unit relative to a refrigerant flow direction;
a second evaporator for evaporating refrigerant from said second pressure-reducing unit, said second evaporator being disposed in said rear air-conditioning case to cool air passing therethrough, parallel to said first evaporator relative to the refrigerant flow direction;
a second blower for blowing air toward said second evaporator; and
a control unit that controls operation of said compressor to change a refrigerant pressure at a suction side of said compressor when a continuous operation time of said compressor passes a predetermined time after said compressor operates,
wherein said second pressure-reducing unit is a thermal expansion valve which adjusts a super-heating degree of refrigerant at an outlet of said second evaporator.

15. The air conditioner according to claim 14, further comprising
a low-pressure pipe through which refrigerant from an outlet side of said second evaporator is introduced into a refrigerant suction pipe of said compressor,
wherein said low-pressure pipe is disposed at a position lower than said refrigerant suction pipe.

* * * * *